(12) United States Patent
Thiruvidam et al.

(10) Patent No.: US 9,189,131 B2
(45) Date of Patent: Nov. 17, 2015

(54) CONTEXT MENUS

(71) Applicant: Hewlett-Packard Development Company, L.P., Houston, TX (US)

(72) Inventors: Eniyan Thiruvidam, Bangalore (IN); Gemma Burman, Bangalore (IN); Ninoj Antony, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 337 days.

(21) Appl. No.: 13/763,241

(22) Filed: Feb. 8, 2013

(65) Prior Publication Data

US 2014/0164955 A1 Jun. 12, 2014

(30) Foreign Application Priority Data

Dec. 11, 2012 (IN) .............. 5164/CHE/2012

(51) Int. Cl.
G06F 3/048 (2013.01)
G06F 3/0482 (2013.01)
G06F 3/0488 (2013.01)

(52) U.S. Cl.
CPC .......... *G06F 3/0482* (2013.01); *G06F 3/04883* (2013.01)

(58) Field of Classification Search
CPC .................. G06F 3/0482; G06F 3/04883
See application file for complete search history.

(56) References Cited

U.S. PATENT DOCUMENTS

| 5,805,167 | A   | * | 9/1998  | van Cruyningen | 715/808 |
|-----------|-----|---|---------|----------------|---------|
| 6,762,777 | B2  |   | 7/2004  | Carroll        |         |
| 7,533,352 | B2  |   | 5/2009  | Chew et al.    |         |
| 7,966,352 | B2  |   | 6/2011  | Madan et al.   |         |
| 2010/0311470 | A1 | * | 12/2010 | Seo et al.    | 455/566 |

OTHER PUBLICATIONS

Lowell Heddings, "Customize the Windows 7 or Vista Send to Menu," Feb. 25, 2007, <http://www.howtogeek.com/howto/windows-vista/customize-the-windows-vista-send-to-menu/>.
Microsoft, "How to send a Word document as an email message directly from Word," Jun. 28, 2012, <https://support.microsoft.com/en-us/kb/290936>.

* cited by examiner

*Primary Examiner* — Claudia Dragoescu
(74) *Attorney, Agent, or Firm* — Mannava & Kang

(57) ABSTRACT

Provided is a method of displaying a context menu. A triggering event related to selection of an object on a computing device is recognized. A direction observed during the selection of the object is recognized. A context menu based on the direction observed during the selection of the object is displayed.

13 Claims, 3 Drawing Sheets

Left-to-right direction

Right-to-left direction

| Invite Person |
| Assign Task |
| Assign Workflow |
| Send Email |

CONTEXT MENUS

CLAIM FOR PRIORITY

The present application claims priority under 35 U.S.C 119 (a)-(d) to Indian Patent application number 5164/CHE/2012, filed on Dec. 11, 2012, which is incorporated by reference herein in its entirety.

BACKGROUND

Computing devices have become the preferred mode for people to create and consume content. Millions of documents such as presentations, spreadsheets, web pages etc. are created each day in electronic form. Some of the reasons behind the popularity of digital content over physical content are the ease of creation, modification, storage and retrieval offered by the electronic format. Development of a Graphical User Interface (GUI) has helped the digital document experience even further. A GUI typically offers a number of user interface elements that makes it easier even for a non-skilled user to interact with a computing device. Some commonly used GUI elements include windows, icons, menus, cursors, controls, icons, tabs, etc.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, a Graphical User Interface may include a variety of user interface elements to make a user-device interaction process a smooth and hassle-free experience. One of the user interface elements is "context menu". It is also called "contextual", "popup", or "shortcut" menu. A context menu is a menu in a graphical user interface that appears upon a user input (or action), such as, but not limited to, by clicking a secondary mouse button (usually the right mouse button). A context menu offers a set of options for a user to further interact with a computing device. The options in a context menu typically relate to the current state, or context, of the operating system or application. Usually the available choices are actions related to a selected object (for instance, a word in a word document).

The appearance of a context menu has no relation with the direction of a triggering event (i.e. a user's input or action). For instance, in a MS Word document, irrespective of a user's input in the form of a mouse press-hold-drag left-to-right selection or right-to-left selection of an object (for example, a string of characters), the same context menu appears on the display. Similarly, a keyboard-based input in the form of Shift press-hold-drag left-to-right selection or right-to-left selection of an object, the context menu that appears is same. Furthermore, even if a selection is made in the vertical direction (Up or Down), the context menu does not change. In other words, a context menu has no association with the direction of a triggering event (or a user's input).

In addition, a context menu offers no document collaboration options to a user. For instance, if a document wants to invite another individual to review a document (or a portion of it), assign a task to another person, assign a workflow to another individual, send an email, etc. there are no options to perform said activities within the framework of a context menu.

Needless to say the aforesaid scenarios are not desirable from a user's perspective who may like to have a direction-based context menu offering significantly more options to select from during an interaction.

Proposed is a solution that provides directional context menus in a Graphical User Interface (GUI) environment. Depending upon the direction of a triggering event, a distinct context menu may be presented to a user. Also proposed is a context menu that offers document collaboration options.

Figure 1:
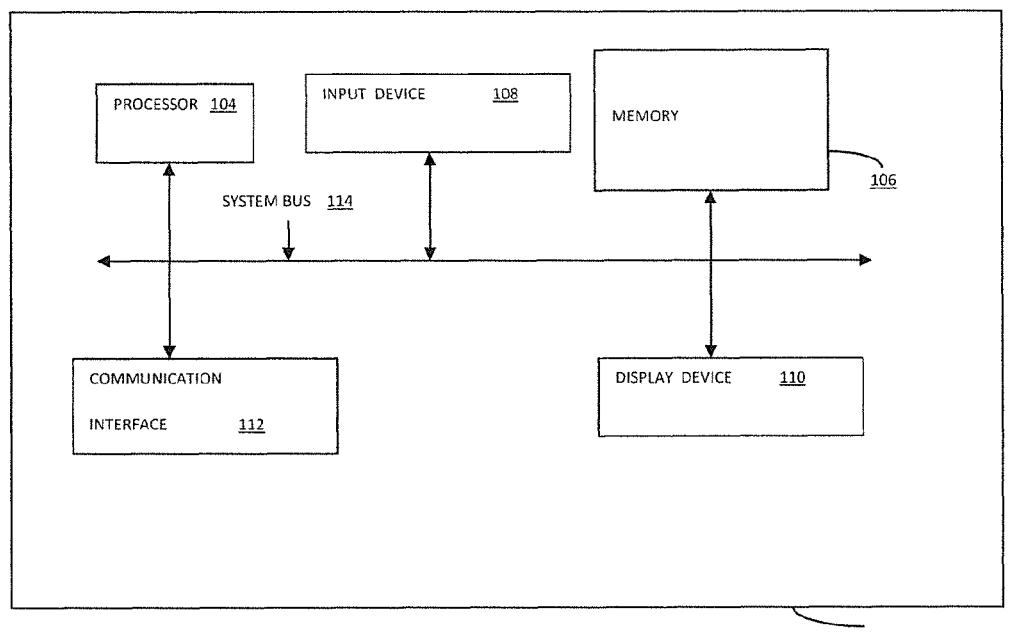
FIG. 1 shows a block diagram of a computer system for implementing context menus, according to an example.

FIG. 1 shows a block diagram of a computer system for implementing directional context menus, according to an example.

Computer system 102 may be a computer server, desktop computer, notebook computer, tablet computer, mobile phone, personal digital assistant (PDA), and the like.

Computer system 102 may include processor 104, memory 106, input device 108, display device 110, and a communication interface 112. The components of the computing system 102 may be coupled together through a system bus 114.

Processor 104 may include any type of processor, microprocessor, or processing logic that interprets and executes instructions.

Memory 106 may include a random access memory (RAM) or another type of dynamic storage device that may store information and instructions non-transitorily for execution by processor 104. For example, memory 106 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

Input device 108 may include a keyboard, a mouse, a touch-screen, or other input device. Display device 110 may include a liquid crystal display (LCD), a light-emitting diode (LED) display, a plasma display panel, a television, a computer monitor, and the like.

Communication interface 112 may include any transceiver-like mechanism that enables computing device 102 to communicate with other devices and/or systems via a communication link. Communication interface 112 may be a software program, a hard ware, a firmware, or any combination thereof. Communication interface 112 may provide communication through the use of either or both physical and wireless communication links. To provide a few non-limiting examples, communication interface 112 may be an Ethernet card, a modem, an integrated services digital network ("ISDN") card, etc.

It would be appreciated that the system components depicted in FIG. 1 are for the purpose of illustration only and the actual components may vary depending on the computing system and architecture deployed for implementation of the present solution. The various components described above may be hosted on a single computing system or multiple computer systems, including servers, connected together through suitable means.

Figure 2:
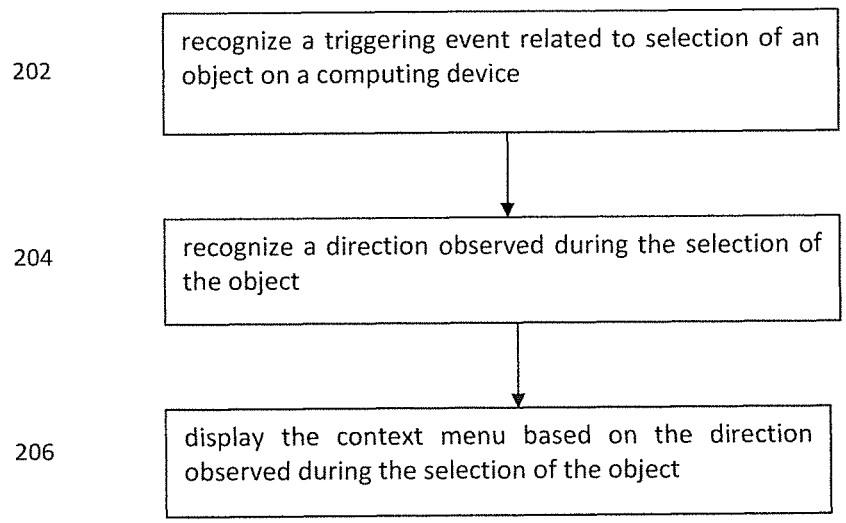
FIG. 2 illustrates a flow chart of a method of displaying a context menu, according to an example.

FIG. 2 illustrates a flow chart of a method of displaying a context menu, according to an example. At block 202, a context menu triggering event is recognized by a computing device. In an implementation, a triggering event is related to a selection of an object on a computing device. A triggering event may be obtained from a pointing device, such as, but not limited to, a mouse, a trackball, a joystick, and the like. A triggering event may also be obtained by other modes of input such as a touch input, a gesture input, a voice input, or any combination of the aforesaid modes and means of input. A triggering event is a form of user interaction with a computing device. A triggering event could take many forms. Some non-limiting examples could include: (a) clicking of a secondary mouse button (usually the right button), (b) pressing and holding the primary mouse button, (c) pressing, holding and dragging a mouse button, (d) pressing a mouse and a keyboard combination, (e) pressing a key on a keyboard, (f) pressing a combination of keys on a keyboard, (f) selecting a Graphical User Interface (GUI) element, such as a menu, an icon, etc., (g) providing a specific voice command, (h) providing a gesture command, (i) touching a designated portion of a GUI, and the like. A triggering event may vary depending on the type of application. For instance, triggering event for a word processing computer application (machine readable instructions) could be different for a spreadsheet computer application. A triggering event could be pre-programmed as part of a computing device's operating system or computer application, or it could be defined by a user as well. For instance, a user may change the current triggering event for a computer application to an event of his choice.

As mentioned earlier, a triggering event may relate to a selection of an object on a computing device. Some non-limiting examples of an object may include an element of a Graphical User Interface (GUI), a content (for example, a text, an image, an illustration, a picture, a diagram, an audio, a video, an animation, etc.), or a portion thereof. An object may be present on a user's computing device or on a remote computer server which may be coupled to the user's computing device through wired or wireless means.

To provide an example of a context menu triggering event, let's consider a user interaction in the form of pressing, holding and dragging a mouse button. A user may use aforesaid combination (pressing, holding and dragging) of user input to select a portion of content in a computer application (machine readable instructions) such as MS Word. In another example, if a triggering event is a voice-based command, for instance "Show", voicing the word would act as a context menu triggering event for the computing device.

At block 204, a direction observed during the selection of an object on a computing device is recognized. To provide an illustration in the context of an earlier example of a user interaction in the form of pressing, holding and dragging a mouse button. In said example, a user may use a combination of a press-hold-drag in any direction to select a portion of text in a word processor document. The direction of selection of a text could be right, left, up or down, or any combination thereof.

In another example, a user may want to crop an image (for example, a photograph). In such case, a user may decide to select a portion of the photograph by providing a press-hold-drag input (from a mouse device) from a left-to-right direction, a right-to-left direction, an up-to-down direction, a down-to-up direction, or any combination thereof. The embodiment would recognize the direction pursued during the selection of an object or a portion thereof (cropping of the photograph in this case).

At block 206, a context menu is displayed based on the direction observed during the selection of an object at block 204. In an implementation, contents of a context menu depend on the direction observed during the selection of an object. In other words, a context menu displayed when the direction observed during the selection of an object is from right-to-left would be different from a context menu displayed when the direction is from left-to-right. Similarly, different context menus would be displayed if the direction is from up-to-down or down-to-up.

Figure 3A:
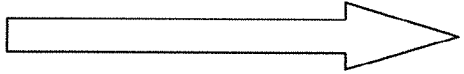
FIGS. 3A and B show illustration of context menus, according to an example.
Figure 3A:
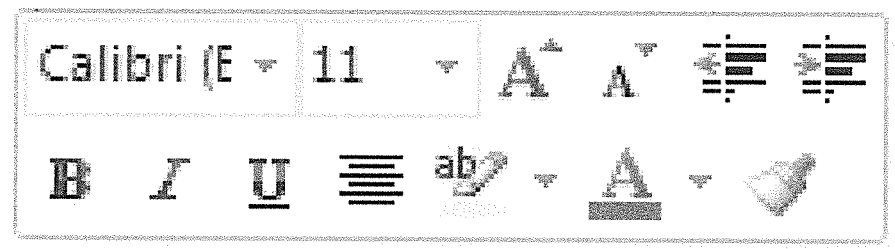

To provide an illustration, if a user selects a text in a word processor document on a computing device from left-to-right direction, a "formatting" context menu may appear. A context menu lists an action that may be applied to a selected object. In this case, a "formatting" text menu may include options to format the text selected by a user. These options could include, for instance, selection of a font type, font size, font color, to underline a text, to change a text to a "Bold" or "Italic" format, and the like. A "formatting" context menu is illustrated in FIG. 3A.

Figure 3B:
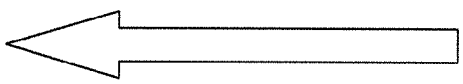

On the other hand, if a user selects the same or a different text in the word processor document from right-to-left direction, a "collaboration" context menu may appear. A "collaboration" text menu may include options to collaborate with another user(s) on the document. These options may include, for example, an option to invite a person to review the documents, to assign a task related to the document to another individual, to send an email, to assign a workflow, etc. A "collaboration" context menu is illustrated in FIG. 3B. In an implementation, a "collaboration" context menu provides an option for collaboration on the object either from within the application or by triggering an external application. There's no limitation as to what options could be provided in a context menu. And, in an implementation, contents of a context menu are configurable by a user.

In an implementation, a displayed context menu is in the form of a grid. For example, context menu illustrated in FIGS. 3A and 3B. However, there's no limitation as to shape and size a context menu may take. Also, a context menu may include a submenu or a plurality of submenus. In such case, the first displayed context menu may be termed as main context menu. A submenu may be triggered by recognizing another trigger event, which could be similar to the earlier triggering event (for the main context menu) or different. To provide a non-limiting example, a triggering event for a submenu could be clicking of a user interface element within the main context menu.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system etc. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of displaying a context menu, comprising:
recognizing a triggering event related to selection of an object displayed on a computing device;
recognizing a direction of an input device movement observed during the selection of the object;
selecting one of a first context menu and a second context menu based upon the recognized direction of the input device movement, wherein the first context menu corresponds to a first recognized direction of the input device movement and the second context menu corresponds to a second recognized direction of the input device movement, and wherein the first context menu lists options for formatting the object and the second context menu lists options for collaborating on the object with another user, wherein the options for collaborating on the object include an option to assign a task related to the object for the another user and an option to assign a workflow related to the object that includes the another user; and
displaying the selected one of the first context menu and the second context menu.

2. The method of claim 1, wherein contents of the context menu depend on the direction observed during the selection of the object.

3. The method of claim 1, wherein the triggering event is obtained from one or a combination of a pointing device input, a keyboard input, a gesture input, a touch input and a voice input.

4. The method of claim 1, wherein the direction of the input device movement observed during the selection of the object is one of left, right, up, down, or any combination thereof.

5. The method of claim 1, wherein the triggering event is a press-hold-drag input from one or a combination of a mouse device, a keyboard, a touchpad and a touch screen.

6. The method of claim 1, wherein the first context menu and the second context menu are elements of a Graphical User Interface (GUI).

7. The method of claim 1, wherein the first context menu and the second context menu are grids.

8. The method of claim 1, wherein the first context menu includes a submenu or a plurality of submenus.

9. The method of claim 1, wherein the object is one of a text, a picture and a diagram.

10. A computer system, comprising:
an input device to receive a triggering event related to selection of a displayed object;
a processor;
a memory on which is store machine readable instructions that are to cause the processor to:
recognize the triggering event;
recognize a direction of a cursor movement observed during the selection of the object;
select one of a first context menu and a second context menu based upon the recognized direction of the cursor movement, wherein the first context menu corresponds to a first recognized direction of the cursor movement and the second context menu corresponds to a second recognized direction of the cursor movement, and wherein the first context menu lists options for formatting the object and the second context menu lists options for collaborating on the object with another user, wherein the options for collaborating on the object include an option to assign a task related to the object for the another user and an option to assign a workflow related to the object that includes the another user; and
a display device to display the selected one of the first context menu and the second context menu.

11. The system of claim 10, wherein the object is present on the computer system or a remote computer server coupled to the computer system.

12. The system of claim 10, wherein contents of the first context menu and the second context menu are configurable by a user.

13. A non-transitory computer readable storage medium on which is stored machine readable instructions that when executed by a processor are to cause the processor to:
recognize a triggering event related to selection of an object displayed on a computing device;
recognize a direction of an input device movement observed during the selection of the object;
selecting one of a first context menu and a second context menu based upon the recognized direction of the input device movement, wherein the first context menu corresponds to a first recognized direction of the input device movement and the second context menu corresponds to a second recognized direction of the input device movement, and wherein the first context menu lists options for formatting the object and the second context menu lists options for collaborating on the object with another user, wherein the options for collaborating on the object include an option to assign a task related to the object for the another user and an option to assign a workflow related to the object that includes the another user; and
display the selected one of the first context menu and the second context menu.

* * * * *